United States Patent
Lee

(10) Patent No.: US 10,521,676 B2
(45) Date of Patent: Dec. 31, 2019

(54) LANE DETECTION DEVICE, LANE DEPARTURE DETERMINATION DEVICE, LANE DETECTION METHOD AND LANE DEPARTURE DETERMINATION METHOD

(71) Applicant: FOUNDATION OF SOONGSIL UNIVERSITY INDUSTRY COOPERATION, Seoul (KR)

(72) Inventor: Chan Ho Lee, Seoul (KR)

(73) Assignee: FOUNDATION OF SOONGSIL UNIVERSITY INDUSTRY COOPERATION, Seoul (KR)

( * ) Notice: Subject to any disclaimer, the term of this patent is extended or adjusted under 35 U.S.C. 154(b) by 191 days.

(21) Appl. No.: 15/868,246

(22) Filed: Jan. 11, 2018

(65) Prior Publication Data
US 2018/0197021 A1 Jul. 12, 2018

(30) Foreign Application Priority Data
Jan. 11, 2017 (KR) .................. 10-2017-0004091

(51) Int. Cl.
*G06K 9/00* (2006.01)
*G06T 7/90* (2017.01)
(Continued)

(52) U.S. Cl.
CPC ....... *G06K 9/00798* (2013.01); *G06K 9/4604* (2013.01); *G06T 7/11* (2017.01); *G06T 7/90* (2017.01)

(58) Field of Classification Search
CPC ............. G06K 9/00798; G06K 9/3233; G06K 9/4604; G06K 9/4652; B60W 30/12;
(Continued)

(56) References Cited

U.S. PATENT DOCUMENTS

| 2009/0201370 A1* | 8/2009 | Otsuka | G06K 9/3233 348/148 |
| 2010/0086174 A1* | 4/2010 | Kmiecik | G06K 9/00798 382/103 |

(Continued)

FOREIGN PATENT DOCUMENTS

| KR | 10-2014-0132210 A | 11/2014 |
| KR | 10-2015-0112195 A | 10/2015 |

OTHER PUBLICATIONS

Korean Office Action dated Nov. 28, 2017 in connection with the counterpart Korean Patent Application No. 10-2017-0004091.

*Primary Examiner* — Tom Y Lu
(74) *Attorney, Agent, or Firm* — Hauptman Ham, LLP

(57) ABSTRACT

A lane detection and lane departure determining device and method are provided. The lane detection device includes a first Region of Interest (ROI) setting unit configured to set a rectangular ROI from an input image which is a road image, a second ROI setting unit configured to set a Λ-ROI having distorted trapezoidal shape from the rectangular ROI, and a lane detection unit configured to detect the lane including a left and right lane marking in the Λ-ROI. The second ROI setting unit is configured to calculate a merged first line segment through a merging process, obtains a left and right second line segment by scanning brightness, and determines the left and right second line segment as a temporary left and right lane marking when a preset condition is satisfied. The Λ-ROI is determined by changing a slope of the temporary left and right lane marking in a predetermined range.

17 Claims, 16 Drawing Sheets

(51) Int. Cl.
*G06K 9/46* (2006.01)
*G06T 7/11* (2017.01)

(58) Field of Classification Search
CPC ......... B60Y 2300/12; G06T 7/11; G06T 7/90; G08G 1/167
See application file for complete search history.

(56) References Cited

U.S. PATENT DOCUMENTS

2010/0104199 A1* 4/2010 Zhang ................ G06K 9/00798
382/199
2013/0272577 A1* 10/2013 Sakamoto .............. G08G 1/167
382/103
2014/0067250 A1* 3/2014 Bone ...................... G08G 1/167
701/301

\* cited by examiner

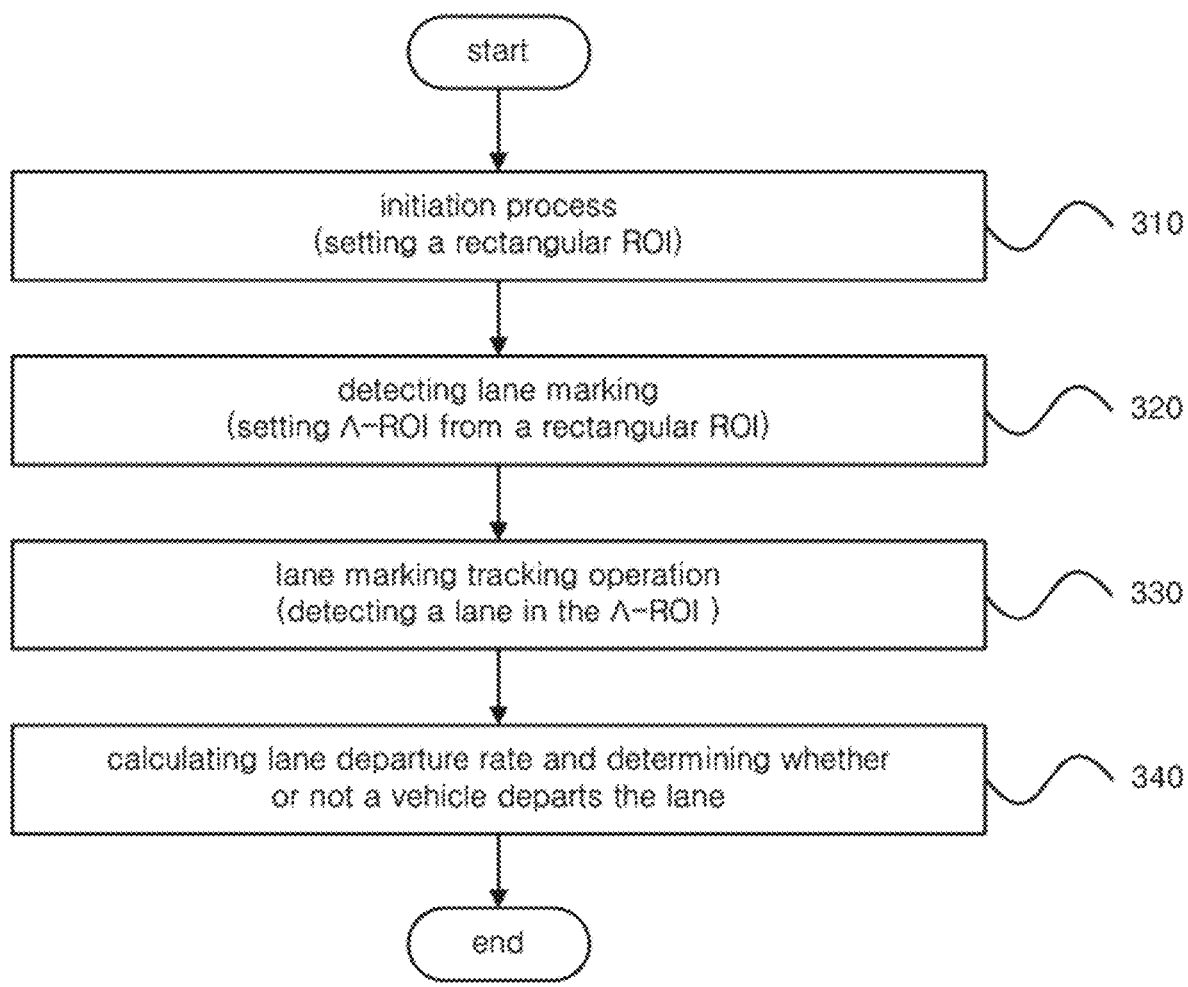

LANE DETECTION DEVICE, LANE DEPARTURE DETERMINATION DEVICE, LANE DETECTION METHOD AND LANE DEPARTURE DETERMINATION METHOD

CROSS-REFERENCE TO RELATED APPLICATION

This application claims priority under 35 U.S.C. § 119(a) to a Korean Patent Application No. 10-2017-0004091 filed on Jan. 11, 2017 the disclosure of which is incorporated herein by reference in its entirety.

TECHNICAL FIELD

The present disclosure relates to a device and a method of detecting rapidly and effectively a lane under unfavorable conditions, and more particularly to a device and a method of determining lane departure of a vehicle through the detection of the lane.

RELATED ART

Recently, intelligent vehicles have been actively developed by incorporating IT technologies into the vehicle. Accordingly, convenience and safety of the vehicle has been greatly improved. Research has been divided into a study for improving performance and the safety in driving of the vehicle and a field for enhancing the convenience and the safety by providing information concerning state of the vehicle, surrounding environment and so on. Additionally, research concerning detecting circumstance by analyzing an image taken by a camera is important.

In particular, lane detection research is usable for estimating location and direction of the vehicle on the lane. Lane departure of the vehicle on a roadway is sensed by using the lane detection, and a driver is notified of the sensed result. The driver may recognize the lane in every driving circumstance. An automatic driving system provides information for driving the vehicle without the lane departure. Additionally, information for recognizing location of other vehicles and obstacles is provided, and the provided information may be also used in an obstacle avoidance system.

Techniques for detecting the lane using various sensors such as an imaging device, a camera, a lane detection sensor, laser detection, a GPS, etc. have been studied. A method using the camera is most widely used without limitation of a specific condition. The method using the camera provides accurate location information without installing extra device on a road or on an exterior of the vehicle, unlike a method using the lane detection sensor or a method using the laser detection.

In a lane detection algorithm using the camera, the core operation is to extract a road marking including a lane marking from the inputted image. Since the vehicle moves slightly in the right and left direction within the lane and the lane does not always keep a straight line, it is not easy to detect the lane through one feature (e.g., calculation method). Accordingly, the lane detection is performed in real time through a proper threshold value setting method, an edge detection method, a lane marking detection method and so on.

While it is relatively easy to detect the lane on a highway so that a relatively simple algorithm is enough for lane detection, setting of ROI (Region Of Interest), effective noise removal and an image processing algorithm for detecting lane marking are important elements for the lane detection, in a complicated road environment such as a boundary lane or city area, etc. Selection of the ROI and the image processing algorithms significantly impact a detection ratio and detection performance.

The matters described as the related art have been provided merely for assisting in the understanding for the background of the present disclosure and should not be considered as corresponding to the related art known to those skilled in the art.

SUMMARY

An object of the present disclosure provides a device and a method of detecting effectively a lane under unfavorable conditions, and a device and a method of determining lane departure of a vehicle through the detection of the lane.

In an aspect of an exemplary embodiment, the disclosure provides a device for detecting a lane of a vehicle that may include a first ROI setting unit configured to determine a rectangular ROI from an input image which is a road image, a second ROI setting unit configured to determine a Λ-ROI having distorted trapezoidal shape from the rectangular ROI, and a lane detection unit configured to detect the lane including a left lane marking and a right lane marking in the Λ-ROI. In particular, the second ROI setting unit may be configured to calculate a merged first line segment through merging process of first line segments extracted from the rectangular ROI, to obtain a left second line segment and a right second line segment by scanning brightness, to determine the left second line segment and the right second line segment as a temporary left lane marking and a temporary right lane marking when a preset first condition is satisfied, and to set the Λ-ROI by changing a slope of the temporary left lane marking and a slope of the temporary right lane marking in a predetermined range.

In some exemplary embodiments, the rectangular ROI may be a color image. For example, the second ROI setting unit may be configured to convert the color image of rectangular ROI into a gray scale image of rectangular ROI, extract the first line segments from the gray scale image of rectangular ROI, or add color difference information of the color image of rectangular ROI to the gray scale image of rectangular ROI and extract the first line segments from the gray scale image of rectangular ROI to which the color difference information is added.

In other exemplary embodiments, the color difference information may include U-V information or V-U information. For example, the second ROI setting unit may be configured to extract the first line segments from the gray scale image of rectangular ROI to which the color difference information is added when a standard deviation of the color difference information is greater than a preset threshold value, and may be configured to extract the first line segments using the gray scale image of rectangular ROI when the standard deviation of the color difference information is less than the preset threshold value.

The merging process may be performed at least once while at least two first line segments exist, and in each merging process, the second ROI setting unit may be configured to merge two extracted/previously merged first line segments. The second ROI setting unit may be configured to obtain an upper horizontal line and a lower horizontal line for the merging, may be configured to extend one or two extracted/previously merged first line segments to enable the extended extracted/previously merged first line segments to abut the upper horizontal line and the lower horizontal line, may be configured to merge extended or unexpanded two extracted/previously merged first line segments when a distance between two intersection points of the upper or lower horizontal line and the extended or unexpanded two extracted/previously merged first line segments is less than a preset threshold distance, and difference of slopes of the two first line segments is less than a preset threshold slope.

The merging process may be performed hierarchically in the order of vertical merging process and then horizontal merging process, and the vertical merging process and the horizontal merging process may have different preset threshold distance and preset threshold slope. For example, the vertical merging process merges first line segments may be configured to be extracted from the same side of a lane marking, and the horizontal merging process may be configured to merge the extracted/previously merged first line segments originated from the opposite side of a lane marking.

In some exemplary embodiments, the preset first condition may include at least one selected from a group consisting of preset slope, predetermined width of the lane and preset location of a vanishing point. The second ROI setting unit may be configured to determine the left lane marking and the right lane marking by merging temporary lane markings in specific number of contiguous frames included in the input image.

The lane detection unit may be configured to calculate a merged third line segment through merging process of third line segments extracted in the Λ-ROI that obtains a left fourth line segment and a right fourth line segment by scanning brightness, may be configured to determine the left fourth line segment and the right fourth line segment as the left lane marking and the right lane marking when a preset second condition is satisfied. For example, the preset second condition may include a preset slope, a predetermined width of the lane, and a preset location of a vanishing point accumulated at previous frames.

The Λ-ROI may be a color image. For example, the lane detection unit may be configured to convert the color image of Λ-ROI into a gray scale image of Λ-ROI, may be configured to extract the third line segments from the gray scale image of Λ-ROI, or may be configured to add color difference information of the color image of Λ-ROI to the gray scale image of Λ-ROI and extract the third line segments from the gray scale image of Λ-ROI to which the color difference information is added.

In another aspect of an exemplary embodiment, the disclosure provides a device for detecting lane departure of a vehicle that may include a first ROI setting unit configured to determine a rectangular ROI from an input image which is a road image, a second ROI setting unit configured to determine a Λ-ROI having distorted trapezoidal shape from the rectangular ROI, a lane detection unit configured to detect a lane including a left lane marking and a right lane marking in the Λ-ROI and a lane departure determining unit configured to obtain departure ratio of the lane from the detected lane, and determines when the vehicle departs the lane using the obtained departure ratio. In particular, the lane departure determining unit may be configured to obtain a width of the lane in the input image using the left lane marking and the right lane marking, and may be configured to obtain the departure ratio of the lane using the obtained width of the lane and a width of the vehicle in the input image.

In an exemplary embodiment, the disclosure provides a method of detecting a lane of a vehicle performed in a device including a processor, the method may include setting, by the processor, a rectangular ROI from an input image which is a road image, setting, by the processor, a Λ-ROI having distorted trapezoidal shape from the rectangular ROI and detecting, by the processor, the lane including a left lane marking and a right lane marking in the Λ-ROI. For example, the setting the Λ-ROI may include calculating, by the processor, a merged first line segment through merging process of first line segments extracted from the rectangular ROI, obtaining, by the processor, a left second line segment and a right second line segment by scanning brightness, determining, by the processor, the left second line segment and the right second line segment as a temporary left lane marking and a temporary right lane marking when a preset first condition is satisfied, and setting, by the processor, the Λ-ROI by changing a slope of the temporary left lane marking and a slope of the temporary right lane marking in a predetermined range.

In another exemplary embodiment, the disclosure provides a method of determining lane departure of a vehicle performed in a device including a processor, the method may include setting, by the processor, a rectangular ROI from an input image which is a road image, setting, by the processor, a Λ-ROI having distorted trapezoidal shape from the rectangular ROI, detecting, by the processor, the lane including a left lane marking and a right lane marking in the Λ-ROI and obtaining, by the processor, a departure ratio of the lane from the detected lane, and determining whether or not the vehicle departs the lane using the obtained departure ratio. The lane departure determining unit may be configured to obtain a width of the lane in the input image by using the left lane marking and the right lane marking, and may be configured to obtain the departure ratio of the lane by using the obtained width of the lane and a width of the vehicle in the input image.

A device and a method of the disclosure may be configured to detect more rapidly and more effectively a lane under unfavorable conditions, and determine lane departure of a vehicle through the detection.

BRIEF DESCRIPTION OF DRAWINGS

Example embodiments of the present disclosure will become more apparent by describing in detail example embodiments of the present disclosure with reference to the accompanying drawings, in which:

FIG. 3 is an exemplary flowchart illustrating an operation of the lane detection or departure determining unit according to an exemplary embodiment of the disclosure;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
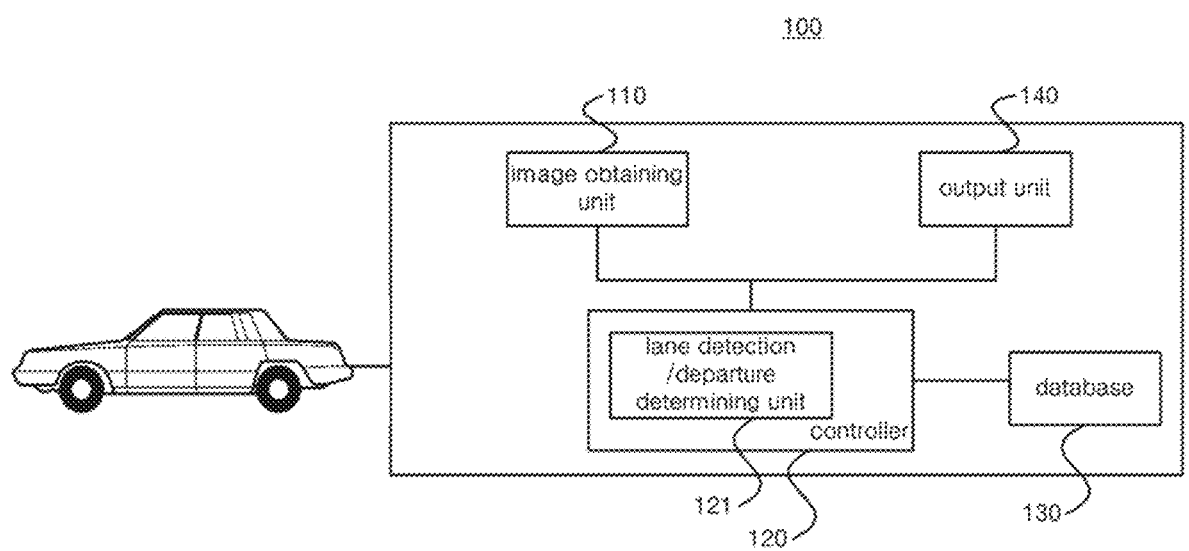
FIG. 1 is an exemplary view illustrating schematically of a lane detection and departure determining system according to an exemplary embodiment of the disclosure.

FIG. 1 is an exemplary view illustrating schematically a lane detection and departure determining system according to an exemplary embodiment of the disclosure. In FIG. 1, the lane detection and departure determining system 100 may include an image obtaining unit 110, a controller 120, a database 130 and an output unit 140. Hereinafter, function of the above elements will be described in detail.

The image obtaining unit 110 may be configured to obtain an input image which is an image of a road or the like. The image obtaining unit 110 may include an imagine device (e.g., a camera) capable of photographing a front direction, a rear direction and a lateral direction by using a rotation reflector, a condensing lens and a photographing element. The rotation reflector may have various shapes such as a hyperboloid, a spherical shape, a cone shape, a combining shape, etc. The image obtaining unit 110 may include a pair of cameras installed in horizontal space at the same central axis of the same surface, or a single camera. The horizontal space may be determined considering a distance between two eyes of typical operator of the vehicle. In addition, the image obtaining unit 110 may include alternative embodiments of imaging devices capable of taking an image. The input image may be a still image or a video.

The controller 120 may be configured to adjust an operation of the lane detection and departure determining system 100. In particular, the controller 120 may be configured to adjust various power driving units for operating the lane detection and departure determining system 100, and may be configured to perform a processing of the image provided from the image obtaining unit 110 and lane detection, lane departure determination and the other operations. Accordingly, the controller 120 may include a lane detection/departure determining unit 121.

The database 130 may be configured to store data and programs for operating the controller 120, and store temporarily inputted/outputted data. The database 130 may include a storage medium such as a flash memory, a hard disk, a solid-state disk (SSD), a secure digital (SD) card memory, a RAM, etc. The output unit 140 may be configured to generate an output related to a visual sense, hearing sense or touch sense, etc. For example, the output unit 140 may include a display unit and a sound output unit.

The display unit may be configured to display information processed by the lane detection and departure determining system 100. For example, the display unit may be configured to display a user interface (UI) or a graphic user interface (GUI) related to driving, and output an alert message when lane departure occurs. Furthermore, the display unit may be configured to display the image obtained by the image obtaining unit 110 or information concerning the lane detected through the controller 120. For example, the display unit may be configured to simultaneously display the image and the information concerning the lane. The image and the information may be displayed horizontally or vertically (e.g., up and down or left and right) in division, or the information may be overlapped on the image. The sound output unit may be configured to output an audio data stored in the database 130. For example, the sound output unit may be configured to output a sound signal related to lane detection result (e.g. lane departure alert, automatic lane keeping alarm, etc.) processed by the controller 120.

Figure 2:
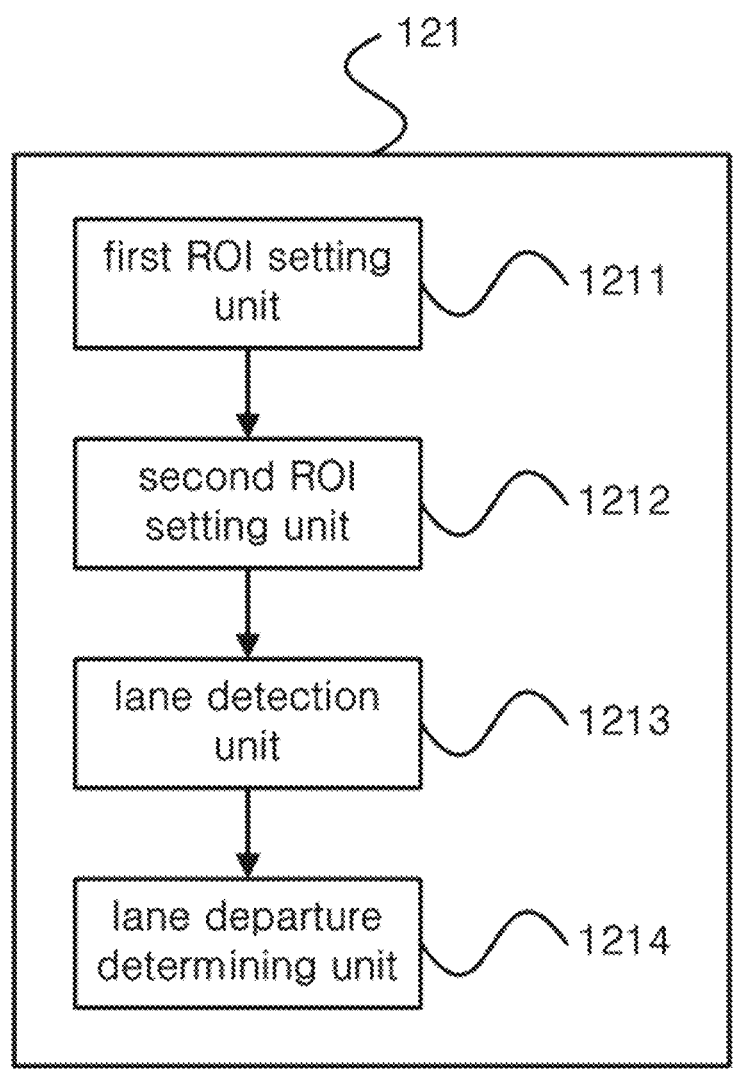
FIG. 2 is an exemplary view schematically illustrating a lane detection or departure determining unit according to an exemplary embodiment of the disclosure.

Hereinafter, the lane detection/departure determining unit 121 as core element of the disclosure will be described in detail. FIG. 2 is an exemplary view schematically illustrating a lane detection/departure determining unit according to an exemplary embodiment of the disclosure. In FIG. 2, the lane detection/departure determining unit 121 of the exemplary embodiment may include a first region of interest (ROI) setting unit 1211, a second ROI setting unit 1212, a lane detection unit 1213 and a lane departure determining unit 1214.

FIG. 3 is an exemplary flowchart illustrating an operation of the lane detection/departure determining unit, i.e. a process of detecting the lane and determining departure of the lane according to an exemplary embodiment of the disclosure. Hereinafter, function of each of elements and steps will be described in detail. In a step of 310, the first ROI setting unit 1211 may determine a rectangular ROI from an input image which is an image of a road obtained from the image obtaining unit 110. In particular, an initialization process of a lane detection process may be performed in the step of 310.

Figure 4A:
FIG. 4A, FIG. 4B, FIG. 4C, FIG. 4D are exemplary views illustrating an image for describing the method of detecting the lane according to an exemplary embodiment of the disclosure.
Figure 4B:

FIG. 4A shows the input image and FIG. 4B illustrates the rectangular ROI. Referring to FIG. 4A and FIG. 4B, the rectangular ROI may be an image formed by removing an upper region above a vanishing point (VP) and a lower region which is an interior of a vehicle where the camera is installed from the input image. In other words, many noise components exist in the upper region above the VP and the lower region which is an interior of a vehicle where the camera is installed, and the rectangular ROI may indicate the image formed by removing two regions. Accordingly, a lane detection ratio may be increased or a calculation time may be reduced. The first ROI setting unit 1211 may determine a fixing region corresponding to a partial region (e.g., ½) of the input region as the rectangular ROI, or may determine the rectangular ROI using an adaptive ROI determining algorithm.

Further, the input image may be a color image. For example, the first ROI setting unit 1211 may be configured to convert the color image of input image into a gray scale image of input image. The first ROI setting unit 1211 may be configured to determine the rectangular ROI from the gray scale image of input image or the gray scale image of input to which color difference information of the color image of input image is added.

In one embodiment, the VP may be calculated through following steps.

In step 1 the input image may be divided into nine sections, and a number of intersection point (IP) may be calculated at a middle section. For example, the intersection point may be formed by a line segment in a right half region (RHR) and a line segment in a left half region (LHR). In the event that a number of the intersection points at the middle section is greater than half of total number of intersection points in the nine sections, next step may be performed. A number of intersection points may again be calculated at other sections until a condition expressed in equation 1 is satisfied.

$$\sum_{i}^{M} N_i > \frac{MP}{M+1}$$ Equation 1

For example, Ni means a number of the intersection point at $i^{th}$ section, and P indicates total number of the intersection points. The initial value of M is 1, and is increased by 1 whenever moving to another section. When equation 1 is satisfied, an integer i at which Ni is the largest is detected. The $i^{th}$ section is selected for the next step.

In step 2 the section obtained in the step 1 may be divided into subsections. A subsection having most number of intersection points may be detected by repeating step 1 of the subsection.

In step 3 the location of a VP box including the largest number of intersection points may be detected. An average of coordinates of the intersection points in the VP box corresponds to a temporary VP.

In step 4 a layer may be formed by dividing a right region and a left region into a wide rectangular region using a preset number of horizontal lines, and layer information indicating density of surviving line segments may be calculated. The layer information may be used for determining a lower boundary of the rectangular ROI because most of line segments of an interior and a hood of a vehicle in which a camera is installed may be horizontal and may be filtered by a slope filter so that the value of layer information below the lower boundary of the rectangular ROI is less than the value of layer information in the rectangular ROI. The layer information may be accumulated at the next frame.

In step 5 a temporary VP and a predicted VP may be calculated using a Kalman filter at the next frame. The temporary VP may be accumulated when it exists in a circle having predetermined radius with a center of the predicted VP.

In step 6 a final VP may be determined by averaging coordinates of the accumulated temporary VPs (NVP) when predetermined number (Nth) of the temporary VPs are accumulated. (NVP>Nth)

In step 7 an upper part boundary may be determined by the VP, and the lower part boundary may be determined using the layer information. Each layer from the bottom may be investigated and may be eliminated when the value is less than a threshold value, which indicates the interior of a vehicle. The layer may also be eliminated when the value is greater than another threshold since a hood often generates surviving line segments that appear in the same position as that of most of the frames.

Figure 4C:
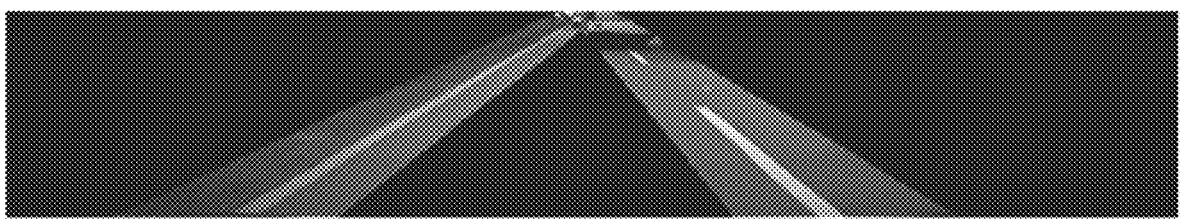

Subsequently, in a step of 320, the second ROI setting unit 1212 may set Λ-ROI having two regions of distorted trapezoidal shapes from the rectangular ROI. In other words, the step 320 may perform an operation of setting the Λ-ROI by detecting a lane marking. For example, the Λ-ROI may be a region set for increasing lane detection ratio and reducing a calculated time, and is shown in FIG. 4C. Since the second ROI setting unit 1212 extracts the Λ-ROI from the rectangular ROI, the Λ-ROI may have the same brightness information as the rectangular ROI, but a region of the Λ-ROI may be different from that of the rectangular ROI. In particular, the second ROI setting unit 1212 may be configured to extract at least one first line segment from the rectangular ROI and sets Λ-ROI based on the first line segment.

In an exemplary embodiment, when at least two first line segments are extracted, the second ROI setting unit 1212 may be configured to calculate a merged first line segment through merging process of the first line segments extracted from the rectangular ROI when a preset condition is met, to obtain a left second line segment and a right second line segment by scanning brightness, to determine the left second line segment and the right second line segment as a temporary left lane marking and a temporary right lane marking when a preset first condition is satisfied, and to set the Λ-ROI by changing a slope of the temporary left lane marking and a slope of the temporary right lane marking in a predetermined range.

Figure 5:
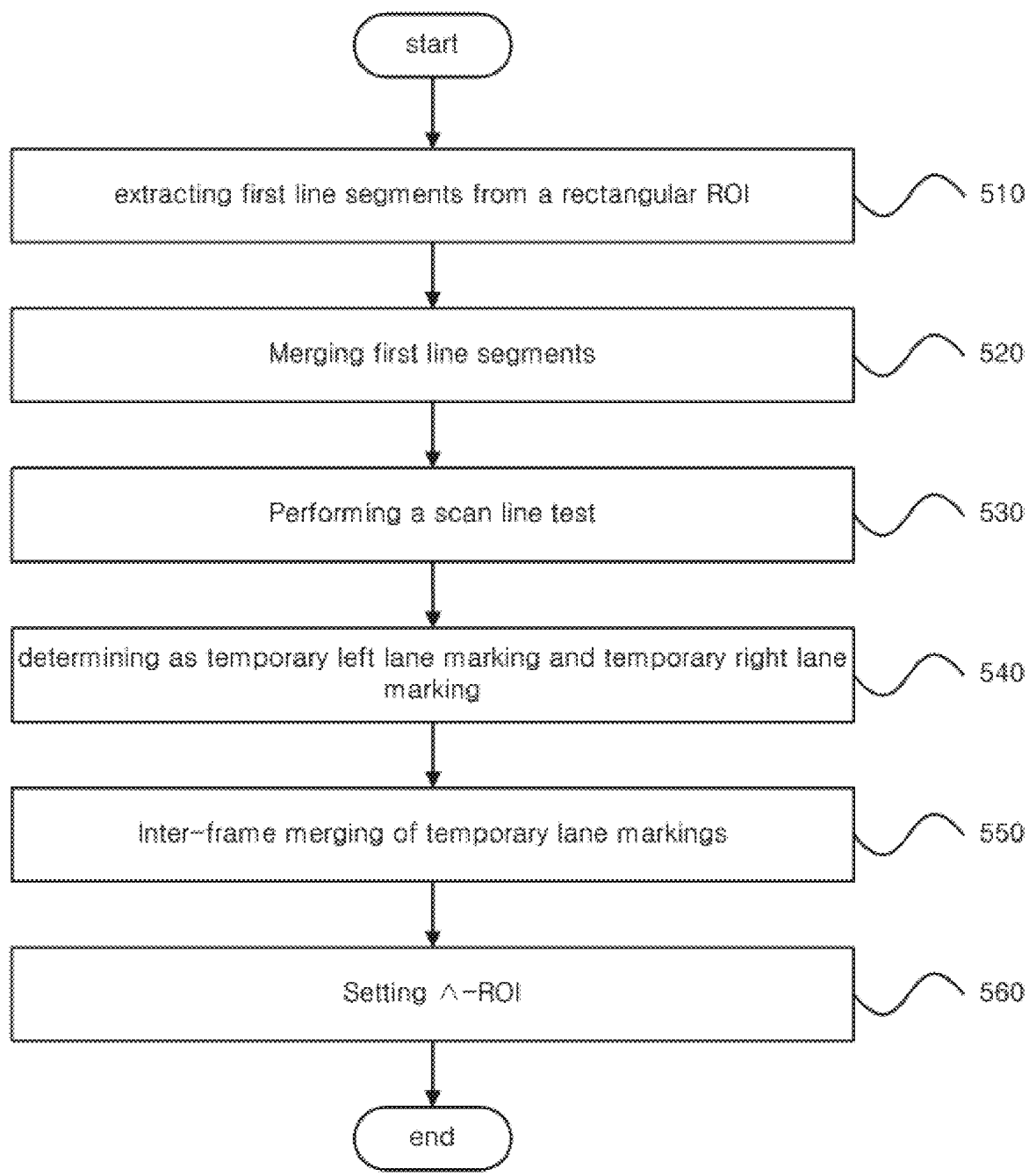
FIG. 5 is an exemplary flowchart illustrating an operation of a second ROI setting unit according to an exemplary embodiment of the disclosure.

Hereinafter, an operation of the second ROI setting unit 1212 will be described in detail with reference to accompanying drawings FIG. 5 to FIG. 9. FIG. 5 is an exemplary flowchart illustrating an operation of a second ROI setting unit according to an exemplary embodiment of the disclosure.

In a step of 510, the second ROI setting unit 1212 may be configured to extract at least one first line segments from the rectangular ROI determine by the first ROI setting unit 1211. For example, the second ROI setting unit 1212 may be configured to extract the at least one first line segment by applying EDLines algorithm. Here, a slope (angle) filter may be used.

Figure 6A:
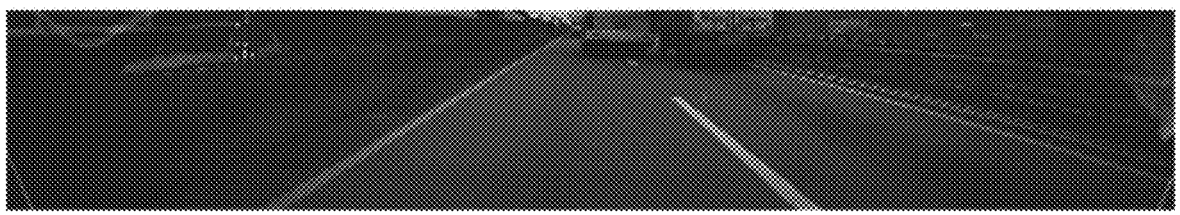
FIG. 6A, FIG. 6B, FIG. 6C, FIG. 6D, FIG. 6E, FIG. 7A, FIG. 7B, FIG. 8A, FIG. 8B, FIG. 8C and FIG. 9, are exemplary views illustrating operation of the second ROI setting unit and the lane detection unit according to an exemplary embodiment of the disclosure.
Figure 6B:
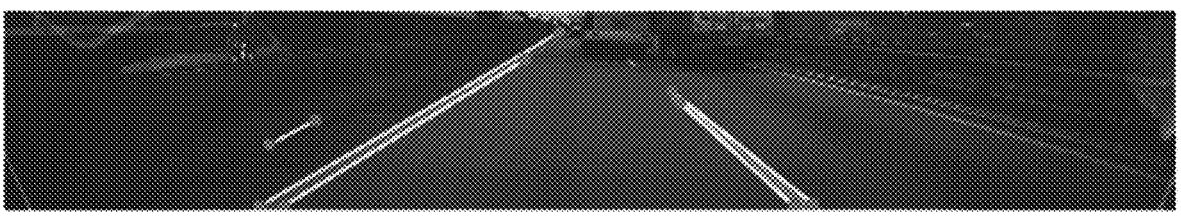

FIG. 6A shows a rectangular ROI, and FIG. 6B illustrates a rectangular ROI including at least one first line segment. The rectangular ROI in FIG. 6A may be a color image. In this case, the second ROI setting unit 1212 may be configured to convert the color image of rectangular ROI into a gray scale image of rectangular ROI, and extract the at least one first lines segments from the gray scale image of rectangular ROI.

Further gray scale information may be used to detect the lane marking in a road background where a white lane marking is used. However, detection of colored lane marking (for example, yellow lane marking or blue lane marking) through the gray scale information due to low contrast is difficult. Specially, it is difficult to detect the colored lane marking when the colored lane marking is not clear or a background of an image has yellow color due to a streetlight at night or in a tunnel. Accordingly, the second ROI setting unit 1212 may add color difference information of the color image of rectangular ROI to the gray scale image of rectangular ROI, and extract the at least one first line segment from a rectangular ROI which is the gray scale image to which the color difference information is added. As a result, the detection ratio of colored lane marking may be increased.

In particular, the second ROI setting unit 1212 may be configured to convert the color image of rectangular ROI into an YUV color model, to obtain U-V information or V-U information as the color difference information from the YUV color model, and to obtain average and standard deviation of the U-V information or the V-U information. For example, the U-V information may be strong to yellow color (e.g., yellow lane marking), and V-U information may be strong to blue color (e.g., blue lane marking). A value of the color difference information may not be less than zero.

The second ROI setting unit 1212 may be configured to compare the standard deviation of the color difference information with a preset threshold value. When the standard deviation of the color difference information is greater than the preset threshold value, the second ROI setting unit 1212 may add color difference information of the color image of rectangular ROI to the gray scale image of rectangular ROI and then may extract the at least one first line segment from the gray scale image of rectangular ROI to which the color difference information is added. When the standard deviation of the color difference information is less than the preset threshold value, the second ROI setting unit 1212 may be configured to extract the at least one first line segment by using the gray scale image of rectangular ROI. When the standard deviation of the color difference information is less than the preset threshold value, yellow background is strong in the color image, and thus it is regarded as noise. Accordingly, the color difference information is not added to the gray scale image of rectangular ROI.

Figure 6C:
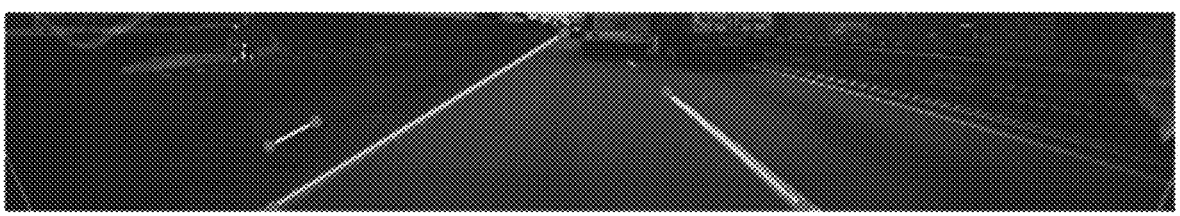

In a step of 520, when at least two first line segments are extracted, the second ROI setting unit 1212 may be configured to calculate a merged first line segment through merging process of the first line segments. For example, the merged first line segment may include at least one left merged first line segment concerning the left half region (LHR) of the rectangular ROI and at least one right merged first line segment concerning the right half region (RHR) of the rectangular ROI. This is shown in FIG. 6C.

In particular, since the lane marking corresponds to bright and thick line, two line segments may be generated in the rectangular ROI for a straight and clear lane marking. However, less than two or more than two lane markings may be generated for a curved lane marking and unclear or distorted image. The line segment extracted from the edge of the lane marking may be similar with respect to the slope (e.g., angle) and location represented by the endpoint locations. This feature may be used for distinguishing a line segment corresponding to the lane marking from a line segment corresponding to the noise.

Accordingly, the second ROI setting unit 1212 may merge the at least two first line segments into the at least one merged first line segment by clustering the first line segments extracted from the rectangular ROI, in the step of 520. This is called the merging process or clustering process. For example, the merging process may be performed at least once while at least two first line segments exist. Additionally, in each merging process, two extracted first line segments may be merged, or one extracted first line segment and previously merged first line segment may be merged, or two previously merged first line segments may be merged. In particular, the second ROI setting unit 1212 may merge a pair of extracted/previously merged first line segment when a preset condition is met, and may repeat the merging process while a pair of the extracted/previously merged first line segments satisfy the preset condition exists.

Further, when two extracted/previously merged first line segments are merged, and the second ROI setting unit 1212 obtains an upper horizontal line and a lower horizontal line for the merging, then one or two extracted/previously merged first line segments may be extended to enable the extended extracted/previously merged first line segments to contact the upper horizontal line and the lower horizontal line. Additionally, a distance between two intersection points of the upper or lower horizontal line and the extended or unextended two extracted/previously merged first line segments may be determined to be less than a preset threshold distance, and difference of slopes of the two extracted/merged first line segments may be less than a preset threshold slope. When the above conditions are satisfied, the second ROI setting unit may merge two extracted/previously merged first line segments.

In particular, the merging process may be of vertical merging process and horizontal merging process hierarchically. The vertical merging process may be performed to merge the first line segments extracted from the same side of a lane marking. Although two first line segments which are almost parallel may be extracted from both long sides of a lane marking, plurality of shorter first line segments may be extracted from each side of a lane marking due to plurality of reasons. The vertical merging process may merge the divided first line segments into one first line segment. The horizontal merging process may merge the first line segments originated from the opposite sides of a lane marking into one first line segment to enable the first line segment to represent a lane marking. As a result, one first line segment may be detected from a lane marking.

The detailed steps of the merge process may be as follows.

In step 1 at least two first line segments may be determined. For example, each of the first line segments may have a number of element (NoE), and initial NoE may be set to 1.

In step 2 the second ROI setting unit 1212 may search a pair of two first line segment for a vertical merging process, and may determine whether or not slopes and endpoints of two first line segments to be merged are similar. The vertical merging process may merge two first line segments extracted from the same edge of a lane marking. In other words, the second ROI setting unit 1212 may be configured to calculate the absolute value of difference of the slopes of the two first line segments and may verify the similarity by comparing the calculated result with preset threshold value. In other words, the second ROI setting unit 1212 may be configured to perform a similarity test for determining whether or not the difference of the slopes of the two first line segments is less than the preset threshold value.

Figure 7A:
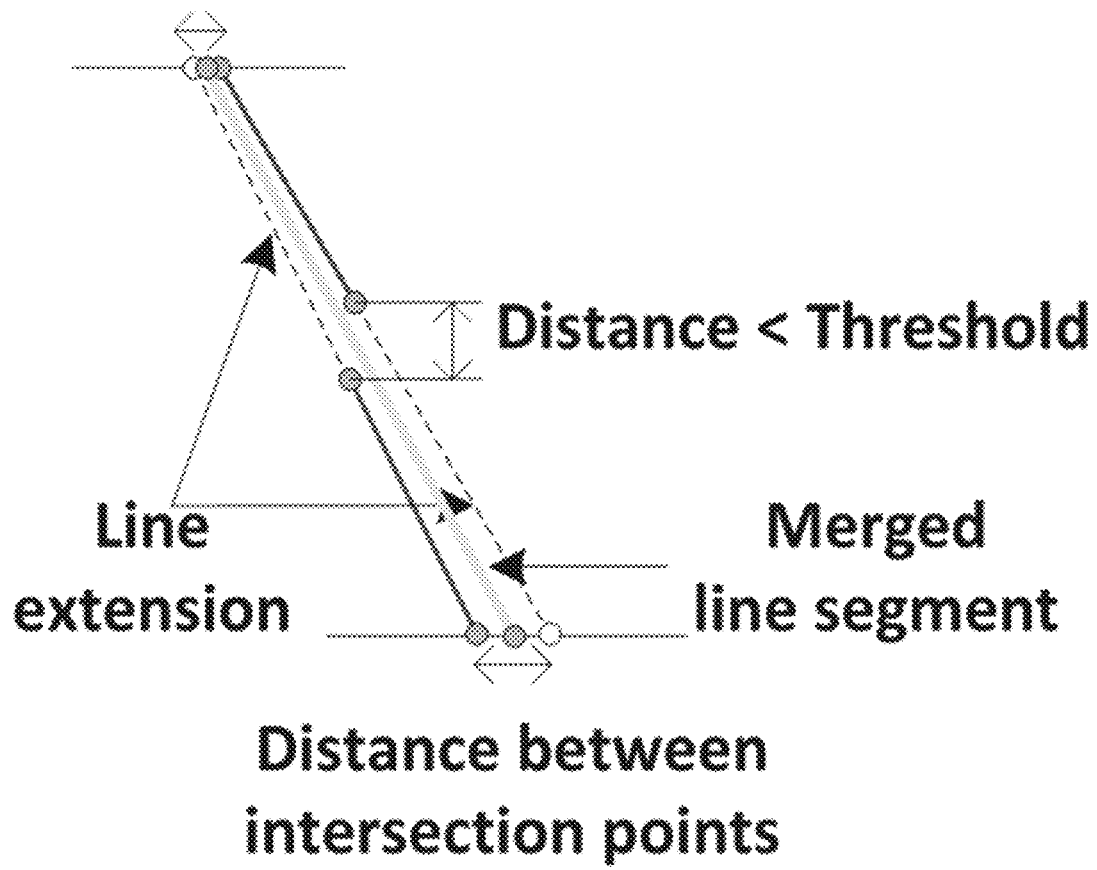

In step 3 the second ROI setting unit 1212 may obtain two horizontal lines (i.e. the upper horizontal line and the lower horizontal line) passing a lowest endpoint and a highest endpoint of the two first line segments when the two first line segments pass the similarity test in step 2. For example, the upper horizontal line may be a horizontal line which passes through the highest endpoint of the two first line segments and the lower horizontal line may be a horizontal line which passes through the lowest endpoint of the two line segments. The upper horizontal line and the lower horizontal line may be used for merging. These are shown in FIG. 7A.

The second ROI setting unit 1212 may extend the endpoints of the two first line segments to the horizontal lines to enable four endpoints of the two first line segments to contact the horizontal lines. In particular, one or two first line segments separated from the upper horizontal line and the lower horizontal line may be extended to abut both the upper horizontal line and the lower horizontal line. The new contact points made by extending two first line segments may be extended endpoints and the two first line segments after the endpoint extension may be extended two first line segments.

The second ROI setting unit 1212 performs a similarity test for determining when the distance between upper endpoints or lower endpoint of the two first line segments is less than the preset threshold value. For example, the distance may be a distance between intersection points of the two first line segments and the upper or the lower horizontal line.

In step 4 the second ROI setting unit 1212 may be configured to merge the pair of the two first line segments when it finds a pair of two first line segments satisfying conditions of the similarity determined in the steps 2 and 3. In other words, the second ROI setting unit 1212 may be configured to merge the two first line segments when difference of slopes of the two first line segments is less than the preset threshold value, the distance between the upper endpoints or lower endpoints of the extended two first line segments is less than the preset threshold value.

In particular, the merged first line segment may have an average slope of the two first line segments as shown in FIG. 7A, and may pass a midpoint between the intersection points. For example, the slope of the merged first line segment may be the average of the slopes of the two first line segments, the upper endpoint of the merged first line segments may be a midpoint of the upper endpoints of the extended two first line segments, and the lower endpoint of the merged first line segments may be a midpoint of the lower endpoints of the extended two first line segments. Subsequently, the second ROI setting unit 1212 may increase NoE of the merged first line segments by 1, and may delete the two first line segments after merging. In particular, the merging of two first line segment may be extracted from the same side of a lane marking.

In step 5 the vertical merging procedure of the step 2 through the step 4 may be repeatedly performed until every pair of the first line segments including the merged first line segments satisfying the conditions of the steps 2 and 3 is deleted. For example, in each vertical merging procedure, two extracted first line segments may be merged, or one extracted first line segment and previously merged first line segment may be merged, or two previously merged first line segments may be merged.

Figure 7B:
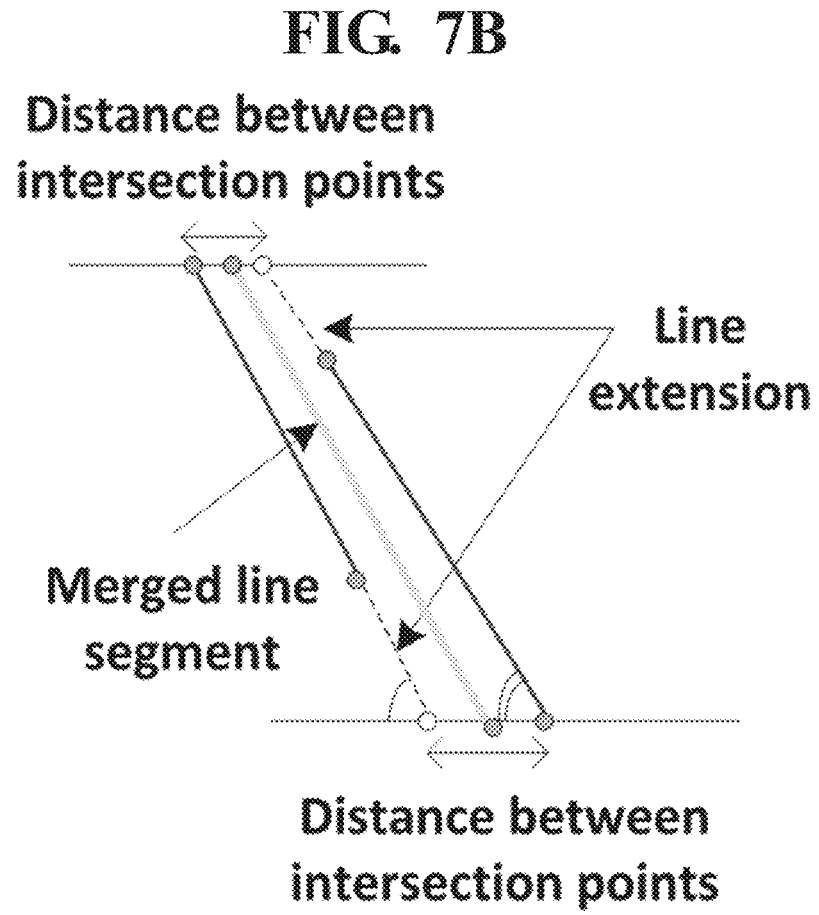

In step 6 the second ROI setting unit 1212 may be configured to perform repeatedly the step 2 to the step 5 for horizontal merging process. The horizontal merging process may merge two first line segments including the merged first line segments extracted from different sides of a lane marking and may use a different threshold value for slope and distance similarity test. This is shown in FIG. 7B. Subsequently, the second ROI setting unit 1212 may increase NoE of the merged first line segment by 1, and may delete the first line segment after merging.

Further, some first line segments that are not merged may exist after the merging procedure is completed, as shown in FIG. 6C. A merged first line segment of which NoE may be greater than 1, corresponds to "a paired first line segments" and there is high probability that the paired first line segments may be a line segment from the lane marking. The un-merged line segment may be used when the paired first line segments not sensed.

In a step of 530 in FIG. 5, the second ROI setting unit 1212 may obtain the left second line segment and the right second line segment by scanning brightness of the rectangular ROI and derivative of the brightness along plurality of imaginary horizontal lines which have constant length and crosses at least one first line segment including the merged first line segment. In particular, the second ROI setting unit 1212 may scan the brightness of the rectangular ROI along the plurality of imaginary horizontal lines crossing at least one first line segment including the merged first line segment, may compare the scanned brightness and its derivative with predetermined brightness and its derivative, respectively, and may be configured to calculate the left second line segment and the right second line segment by using the compared result. This is referred to as a scan line test.

Figure 8A:
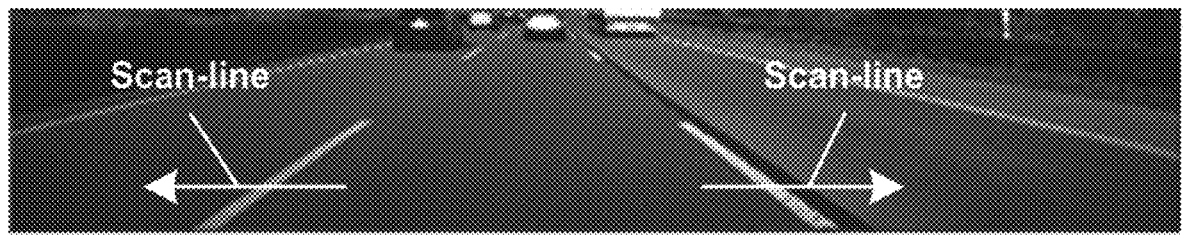
Figure 8B:
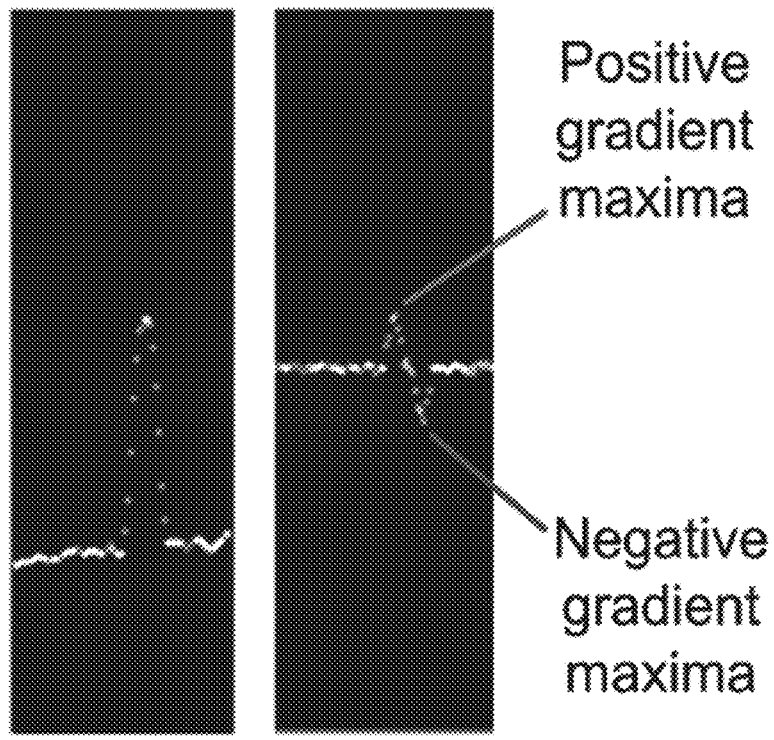
Figure 8C:
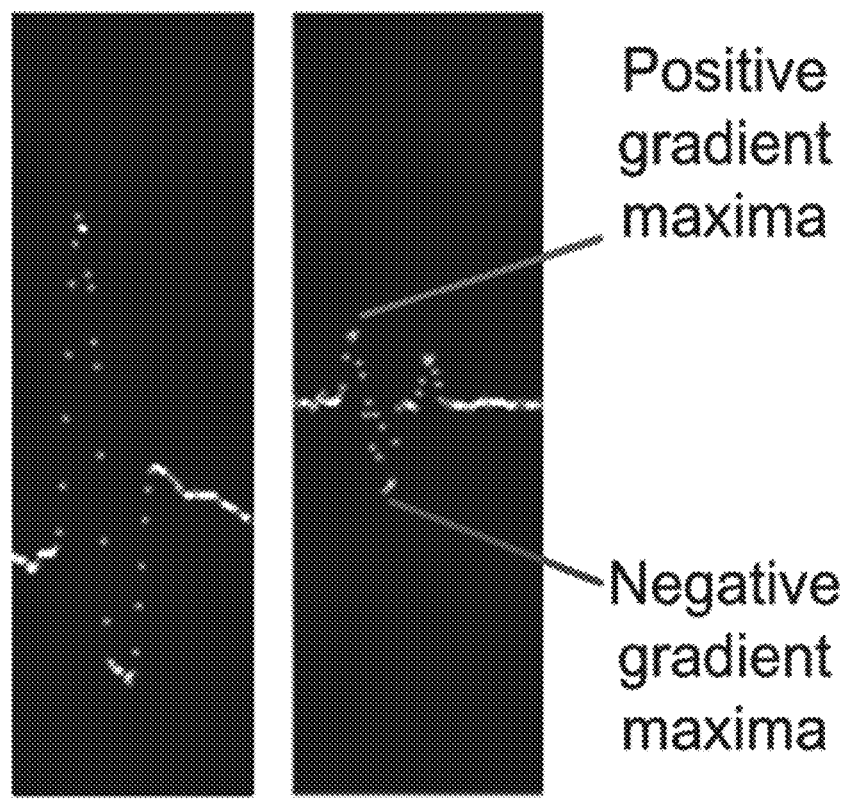

In particular, after the merging process, several extracted first line segments or merged first line segments that are not needed may remain due to noise such as crack, new paved road, shadow and a vehicle. Accordingly, the second ROI setting unit 1212 may be configured to calculate the plurality of imaginary horizontal lines crossing the first line segment including the merged cluster as shown in FIG. 8A, and obtain low-high-low brightness pattern when the brightness of the rectangular ROI is scanned along the plurality of imaginary horizontal lines (FIG. 8B illustrates a scan pattern of a left region, and FIG. 8C shows a scan pattern of a right region). For example, derivatives of the brightness indicate positive peak and negative peak at an edge point of the lane marking. The brightness pattern and the derivative of the brightness may be used for verifying whether or not the first line segment including the merged first line segment is extracted from the lane marking, by comparing average brightness of pixels between two peaks of the derivative with average brightness of pixels outside the two peaks of the derivative. The second line segment may satisfy a brightness condition when the difference between the two average values of brightness is greater than a specific threshold value.

In particular, referring to FIGS. 8A-8C, the scan line test searches pairs of edge points in real lane marking as shown in FIG. 8A, by scanning the plurality of imaginary horizontal lines crossing the first line segment including the merged first line segment. This procedure may be repeatedly performed along equidistant lines toward an upper endpoint from an imaginary horizontal line crossing a lowest endpoint. The second line segment satisfying the scan line test may be regarded as candidate of real lane marking in present frame.

The second line segment satisfying the scan line test may not exist when road state is compromised. For example, the second line segment may not exist when the lane marking is worn out or affected by light reflection on a road during rainy night. Sometimes, the road marking exists even when the lane marking does not exist. Paired first line segment with the highest NoE may be collected when a second line segment does not exist or a paired first line segment closest to a center of the road may be collected if when the NoEs are the same.

Figure 6D:
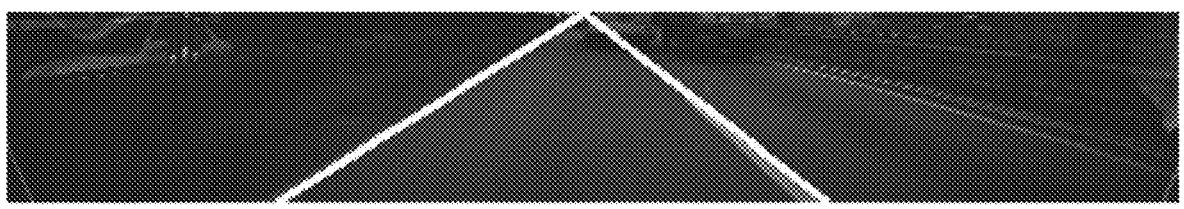

In a step of 540, the second ROI setting unit 1212 may be configured to determine the left second line segment and the right second line segment as temporary left lane marking and temporary right lane marking when the left second line segment and the right second line segment satisfy a preset first condition. This is shown in FIG. 6D. For example, the first condition may include at least one of preset slope condition, preset lane width condition and preset location condition of the VP.

Particularly, the slope or an intersection point of bottom (e.g., base line) of the rectangular ROI and the second line segment may not change nearly from the previous frame in normal circumstance, provided the driver does not change the lane. As a result, the lane width may be almost the same in every frame, in an input image including plural frames. Accordingly, the preset first condition used in the step 540, i.e. the slope condition, the lane width condition and the location condition of the VP may be similar. The similarity test of a slope, lane width and location of VP may verify the accuracy of the temporary lame markings.

When at least two left second line segments or at least two right second line segments satisfying the first condition, the second ROI setting unit 1212 may determine a left second line segment or a right second line segment satisfying more conditions included in the preset first condition as the temporary left lane marking and the temporary right lane marking. When the number of satisfied condition is the same for the left second line segment or the right second line segment, the second ROI setting unit 1212 may determine a left second line segment or a right second line segment which has the greater NoE as the temporary left lane marking or the temporary right lane marking. When the number of satisfied condition and NoEs are the same, the second ROI setting unit 1212 may be configured to determine a left second line segment or a right second line segment which is closer to an imaginary vertical line that passes the center point of the rectangular ROI as the temporary left lane marking or the temporary right lane marking.

Figure 9:
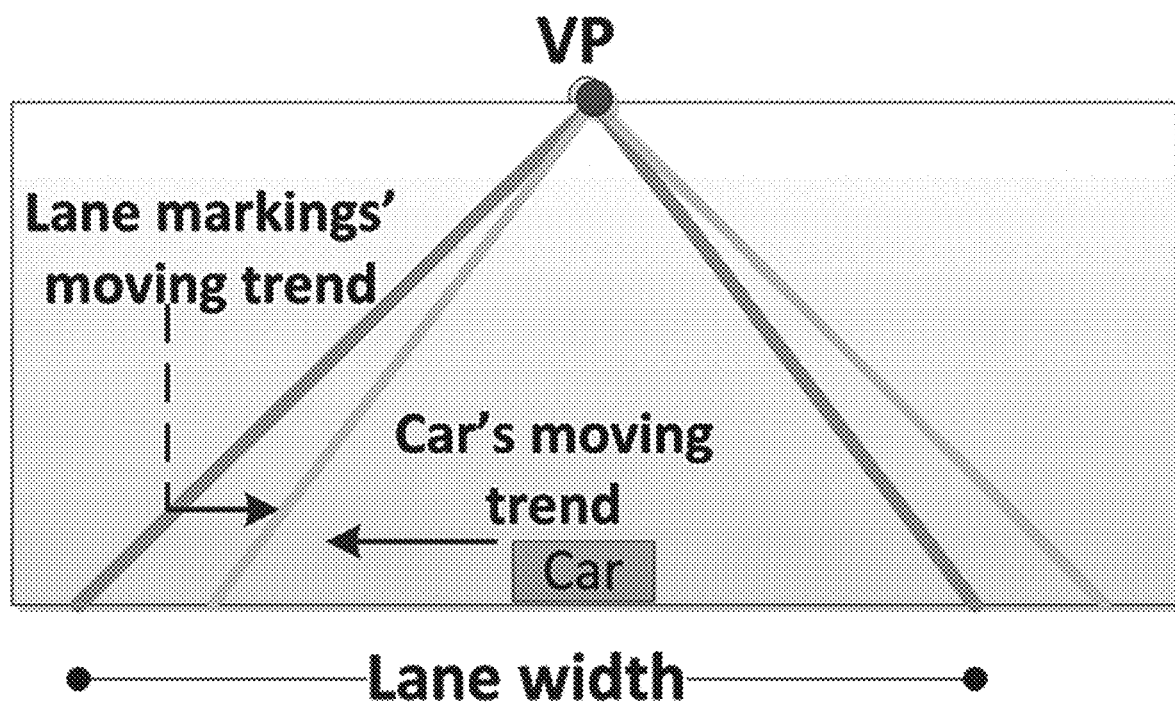

A lower intersection point of an image may move in a reverse direction, i.e. right direction as shown in FIG. 9, when the vehicle moves toward the left direction while the vehicle stays on the same lane. In this case, a measured width of the lane from the input image may be slightly changed, and location of a lower intersection point between the temporary lane markings and the lower boundary of the rectangular ROI or Λ-ROI exists in the limited range (e.g., symmetry condition) provided the vehicle stays on the same lane. An upper intersection point of a pair of temporary lane marking may exist at a location similar to the VP. Locations of a lower intersection point and the upper intersection point may be respectively accumulated. Locations of intersection points in a frame closer to the present frame may have an increased weight in accumulation location calculation. Locations of the intersection points in the present frame may be compared with accumulated locations of corresponding half region, and a pair of temporary lane markings satisfies the symmetry condition when differences between the locations of the intersection points and the accumulated locations are less than threshold values. When the width of the lane is similar in successive frames, distance between the lower intersection points may be used for verifying similarity condition of the widths of the lanes between contiguous frames.

In a step of 550, the second ROI setting unit 1212 may merge the temporary lane markings between frames (e.g., inter-frame merging). In particular, the location of the lane marking in the contiguous frames may be slightly changed under normal driving circumstance. In other words, the location of the lane marking in the contiguous frames in the input image may be in the limited range. Accordingly, the second ROI setting unit 1212 of the exemplary embodiment may accumulate temporary lane markings in the frame, in specific number of contiguous frames (e.g., 30 frames), and may merge or clusters temporary lane markings having similar location. The second ROI setting unit 1212 may search respective clusters (e.g., temporary lane markings) having largest NoE in the left region and the right region of the rectangular ROI after the inter-frame clustering is completed, and may verify whether or not the NoE of the cluster is greater than a threshold value.

Figure 6E:
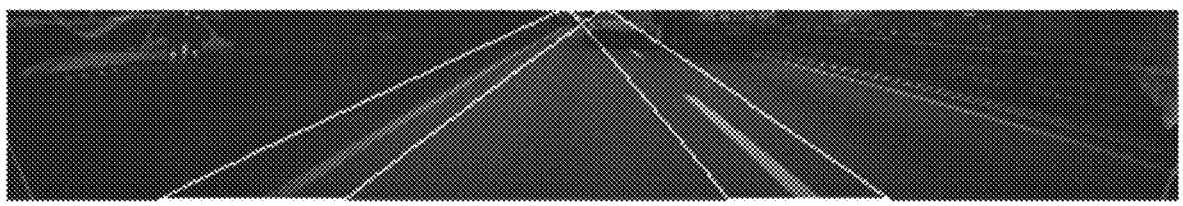

The temporary left lane marking and the temporary right lane marking obtained in the step 540 may be more accurately determined in the step 550 because the merging of the temporary lane markings between the frames is performed in the step 550. In a step of 560, the second ROI setting unit 1212 may set a Λ-ROI by changing the slopes of the temporary left lane marking and the temporary right lane marking in predetermined range. This is shown in FIG. 6E.

Figure 4D:
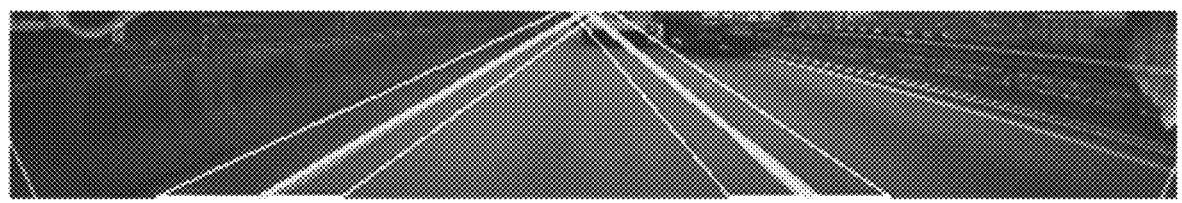

Additionally, the lane recognition and the departure determining method will be described with reference to FIG. 3. In a step of 330, the lane detection unit 1213 may be configured to detect the lane in the Λ-ROI. The lane detection operation of the lane detection unit 1213 may be similar to the second ROI setting unit 1212 except for the ROI. In addition, the lane detection unit 1213 may be configured to perform a lane marking tracking operation for the detected left lane marking and right lane marking of the lane. Most of noise may be excluded in the Λ-ROI because the Λ-ROI includes road only and has a reduced area, and the calculation amount is considerably reduced and the detection ratio is increased. FIG. 4D illustrates a process of detecting the lane in the Λ-ROI.

Figure 10:
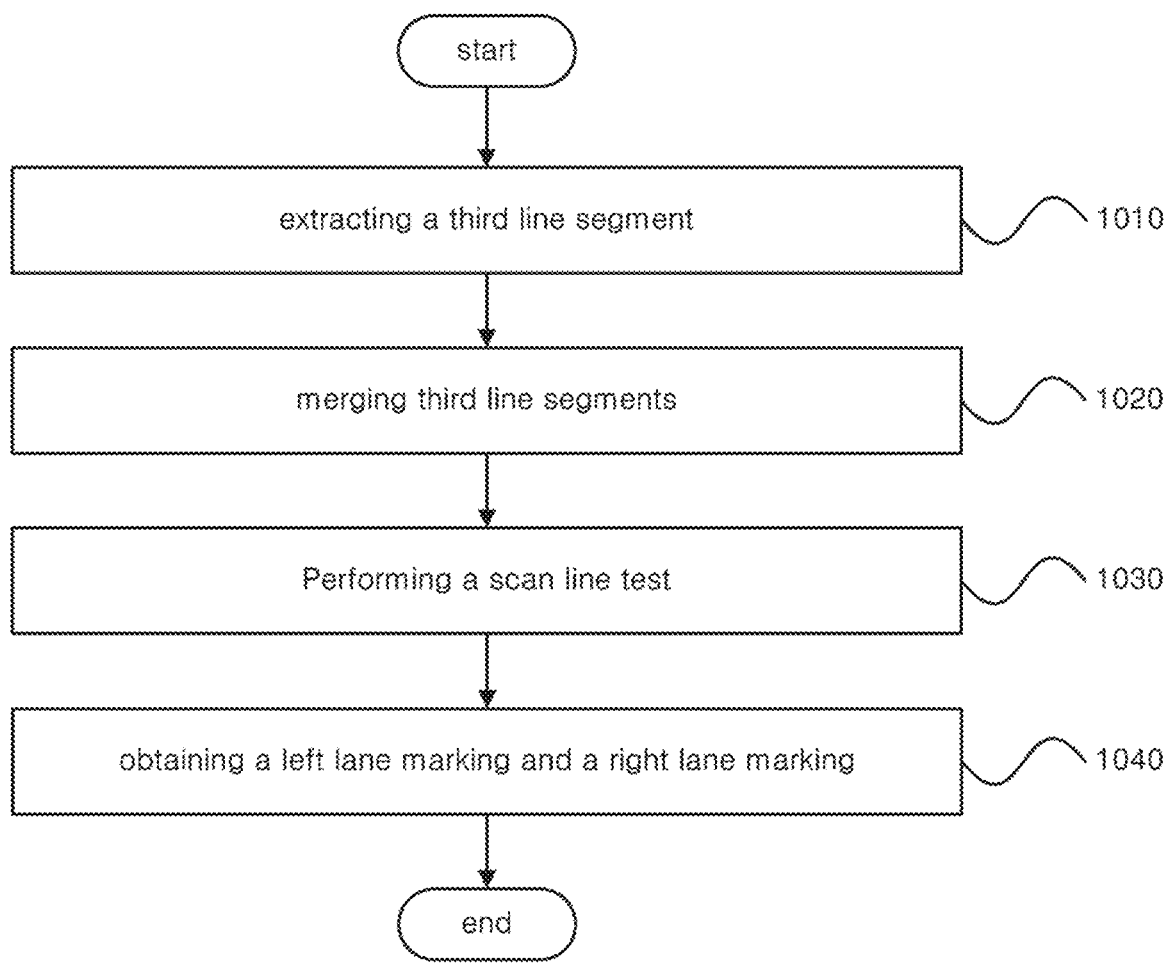
FIG. 10 is an exemplary flowchart illustrating an operation of a lane detection unit according to an exemplary embodiment of the disclosure.

Hereinafter, an operation of the lane detection unit 1213 will be described in detail with reference to accompanying a drawing FIG. 10. FIG. 10 is an exemplary flowchart illustrating an operation of a lane detection unit according to an exemplary embodiment of the disclosure. In a step of 1010, the lane detection unit 1213 may be configured to extract a third line segment in the Λ-ROI. For example, the lane detection unit 1213 may extract the third line segment from the Λ-ROI by applying the EDLines algorithm.

Particularly, the lane detection unit 1213 may be configured to convert a color image of Λ-ROI into a gray scale image of Λ-ROI, and may be configured to extract the third line segments from the gray scale image of the Λ-ROI. In another exemplary embodiment, the lane detection unit 1213 may add color difference information of the color image of the Λ-ROI to the gray scale image of the Λ-ROI, and may be configured to extract the third line segments from the gray scale image of the Λ-ROI to which the color difference information is added. This procedure may be similar to in the step 510, and thus any further description concerning the procedure will be omitted.

In a step of 1020, the lane detection unit 1213 may be configured to obtain a merged third line segment through merging process of the third line segments. For example, the merged third line segments may include a left merged third line segment for a left region of Λ-ROI and a right merged third line segment for a right region of the Λ-ROI. This procedure may be similar to the step 520, and thus any further description concerning the procedure will be omitted.

In a step of 1030, the lane detection unit 1213 may be configured to obtain the left fourth line segment and the right fourth line segment by scanning brightness of the Λ-ROI along plurality of imaginary horizontal lines which have constant length and crosses at least one third line segment including the merged third line segment. This procedure may be similar to the step 530, and thus any further description concerning the procedure will be omitted.

In a step of 1040, the lane detection unit 1213 may be configured to determine the left fourth line segment and the right fourth line segment as a left lane marking and a right lane marking, when the left fourth line segment and the right fourth line segment satisfy a preset second condition. For example, the preset second condition may include symmetry condition and similarity condition of the width of the lane or locations of the lower intersection points of lane markings, and may further include similarity condition of location of the VP. In other words, the preset second condition may include at least one of preset slope condition, preset condition of the width of the lane, preset location condition of the VP and symmetry condition of the lane marking accumulated at previous frames.

In the event that at least two left fourth line segments or at least two right fourth line segments satisfying the second condition exist, the lane detection unit 1213 may be configured to determine a left fourth line segment and a right fourth line segment satisfying additional conditions included in the second conditions as the left lane marking and the right lane marking, respectively. When the number of satisfied condition is the same for the left fourth line segments and the right fourth line segments, the lane detection unit 1213 may be configured to determine a left fourth line segment or a right fourth line segment which has the greater NoE as the left lane marking or the right lane marking. When the number of satisfied condition and NoEs are the same, the lane detection unit 1213 may be configured to determine a left fourth line segment or a right fourth line segment which is closer to the vertical line passing through the center point of the rectangular ROI as the left lane marking and the right lane marking, respectively.

Meanwhile, the Kalman filter may be used for detecting the lane, when the lane marking is not detected in the Λ-ROI. In particular, a slope and locations of lower intersection points of a detected lane marking in a previous frame are provided to the Kalman filter. The Kalman filter may be configured to monitor lane markings of the next frame by generating predicted lane markings. In other words, a predicted lane marking of the Kalman filter may be used when a lane marking is not sensed and when the condition of the width of the lane and VP condition are satisfied.

Hereinafter, the lane departure determining method will be described with reference to accompanying drawing FIG.

3. In the event that the lane is not continuously detected in the step 330, the Λ-ROI may be set in the step 320, and then the step 330 may be performed. In the event that the Λ-ROI is unable to be set in the step 320, the rectangular ROI may be determined by performing the step 310, and then the steps 320 and 330 are performed. In a step of 340, the lane departure determining unit 1214 may be configured to calculate a departure ratio of the lane from the detected lane, and may be configured to determine whether or not the vehicle departs the lane, by using the calculated departure ratio. An operation of the lane departure determining unit 1214 will be described below.

Figure 11:
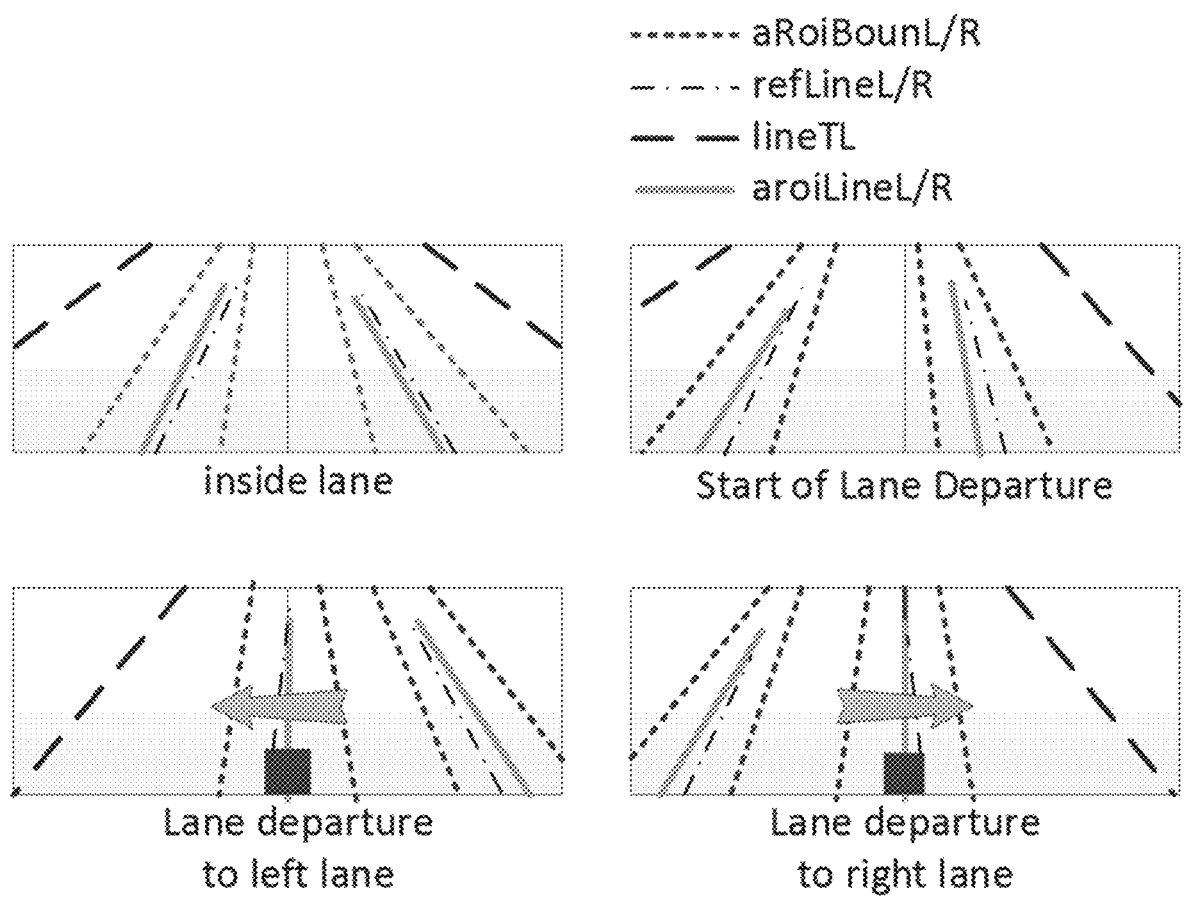
FIG. 11 is an exemplary view illustrating lane markings and Λ-ROIs in the cases of lane departure and lane changing according to an exemplary embodiment of the disclosure.

FIG. 11 illustrates lane markings and Λ-ROIs in the cases of lane departure and lane changing. In FIG. 11, driving state of the vehicle may be divided into driving state on a center of the lane, invasion state to another lane and changing state of the lane. The main lane markings may be represented as aroiLineL/R corresponding to the lane where a vehicle moves and lineTL corresponding to a lane marking in the lane beside the main lane. The lane marking in a side lane (lineTL) may be detected as the same method as the main lane markings after the main lane markings are detected in the step 340. Dotted lines may be represented as aRoi-BoundL/R indicates boundary lines of the Λ-ROI which surrounds the main lane markings. The main lane markings (aroiLineL/R) may be detected in the Λ-ROI. The predicted lane markings (refLineL/R) are determined by the Kalman filter using detected lane markings in the previous frames of the input image.

As described above, the refLineL/R may be used when the aroiLineL/R to be preferentially used is not detected. The auxiliary lane marking, lineTL may be used when the vehicle departs in left or right direction of the lane by calculating the departure ratio of the lane. The lineTL may become a main lane marking in a departure direction and a main lane marking in the departure direction may become a lane marking in a reverse direction, when the vehicle departs entirely the main lane. The lineTL may be enabled to detect the main lane marking in the side lane fast when changing lanes and may help to determine the lane departure using its slope and location. The left down drawing of FIG. 11 shows when the vehicle changes the lane in a left direction, and the right down drawing of FIG. 11 illustrates when the vehicle changes the lane in a right direction.

In an exemplary embodiment, the lane departure determining unit 1214 may obtain a width of the lane in the input image by using the left lane marking and the right lane marking, and may obtain the departure ratio of the lane by using the obtained width of the lane and a width of the vehicle in the input image. The width of the vehicle may be a predetermined value or may be obtained by using the obtained width of the lane.

Figure 12:
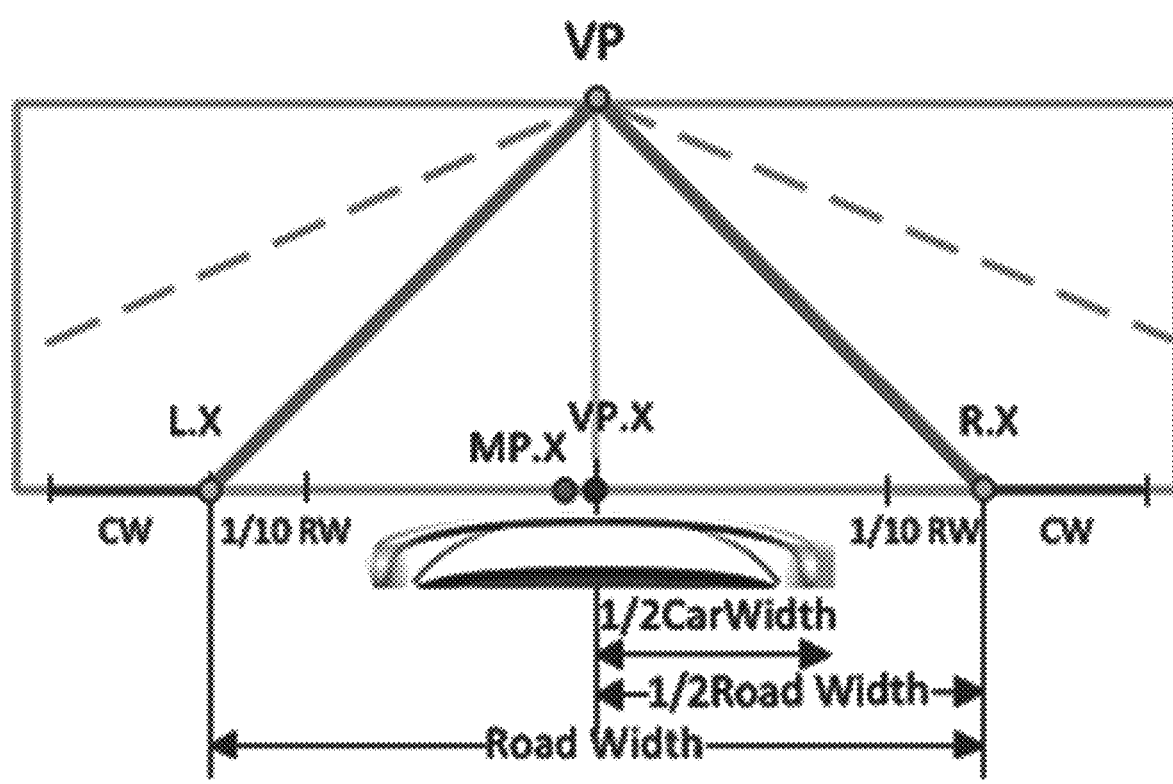
FIG. 12 is an exemplary view illustrating definition and measurement of terms for operation of a lane departure determining unit according to an exemplary embodiment of the disclosure.

For example, referring to FIG. 12, the obtained width of the lane ($RW_{CAL}$) may correspond to a distance between a first intersection point (L.X) and a second intersection point (R.X) which are intersection points of a base line (lower boundary) of the rectangular ROI and the left and right lane marking, respectively.

The obtained width of the vehicle $CW_{CAL}$ may be calculated based on following Equation 2.

$$CW_{CAL} = \frac{RW_{REAL} \times RW_{CAL}}{CW_{REAL}} \quad \text{Equation 2}$$

For example, the $CW_{CAL}$, the $RW_{CAL}$, $CW_{REAL}$ and $RW_{REAL}$ mean the obtained width of the vehicle, the obtained width of the lane, predetermined real width of the vehicle (e.g., 1.85 m) and preset real width of the lane (e.g. 3.5 m), respectively.

In an exemplary embodiment, the lane departure determining unit 1214 may be configured to calculate the departure ratio of the lane by using a midpoint (MP.X) between the first intersection point and the second intersection point, a third intersection point (VP.X) of a perpendicular bisector of the base line of the rectangular ROI passing the VP (e.g., disposed on an upper boundary of the rectangular ROI) and the base line of the rectangular ROI, the obtained width of the lane $RW_{CAL}$ and the obtained width of the vehicle $CW_{CAL}$.

Particularly, the lane departure determining unit 1214 may be configured to calculate respectively departure ratios in the left and right direction using the midpoint MP.X, the third intersection point VP.X, the obtained width of the lane $RW_{CAL}$ and the obtained width of the vehicle $CW_{CAL}$, and determine that the vehicle departs the lane when the higher departure ratio of the departures ratios is greater than a preset threshold value. The departure ratios in the left direction and the departure ratio in the right direction may be expressed in following FIG. 3, respectively.

$$R_{departure\cdot L} = \frac{MP\cdot X - VP\cdot X + \frac{1}{2}CW_{CAL}}{\frac{1}{2}RW_{CAL}} \quad \text{Equation 3}$$

$$R_{departure\cdot R} = \frac{VP\cdot X - MP\cdot X + \frac{1}{2}CW_{CAL}}{\frac{1}{2}RW_{CAL}}$$

For example, $R_{departure.L}$ means the departure ratio in the left direction and $R_{departure.R}$ indicates the departure ratio in the right direction.

In particular, the lane departure determining unit 1214 may be configured to determine that the vehicle is driven on a middle of the lane when the departure ratio is smaller than 0.8

$$\left(\text{i.e. } \frac{\frac{4}{10}RW}{\frac{1}{2}RW}\right),$$

and it determines that the vehicle is driven with leaning to the lane marking when the departure ratio is in the range of 0.8 to 1.0

$$\left(\text{i.e. } \frac{\frac{1}{2}RW}{\frac{1}{2}RW}\right)$$

(e.g., a yellow alert message is outputted). The lane departure determining unit 1214 may be configured to determine that the vehicle departs the lane when the departure ratio is in the range of 1.0 to $$\frac{\frac{1}{2}RW + CW}{\frac{1}{2}RW}$$

(e.g., a red alert message is outputted) and a turn light is off. In the event that the departure ratio becomes $$\frac{\frac{1}{2}RW + CW}{\frac{1}{2}RW},$$

half of the vehicle is in the side lane so that a LineTL becomes a main lane marking and the departure ratio is wrapped to a negative value. Therefore, the lane departure determining unit 1214 saves the status and keep to output red warning signal until the vehicle returns to a normal driving range.

The lane departure determining unit 1214 may be configure to determine that the vehicle starts to change the lane when the departure ratio is in the range of 1.0 to $$\frac{\frac{1}{2}RW + CW}{\frac{1}{2}RW}$$

(e.g., a changing lane message is outputted) and a turn light is on. In the event that the departure ratio is greater than $$\frac{\frac{1}{2}RW + CW}{\frac{1}{2}RW},$$

a greater portion of the vehicle is in the side lane and the lane departure determining unit 1214 keeps track of the other departure ratio value. For example, when a vehicle is changing lane in the right direction, the lane departure determining unit 1214 monitors $R_{departure.R}$ and then monitors $R_{departure.L}$ when $R_{departure.R}$ becomes greater than $$\frac{\frac{1}{2}RW + CW}{\frac{1}{2}RW}.$$

The lane departure determining unit 1214 may be configured to determine that the vehicle has finished changing lane and in in the normal driving range when $R_{deparutre.R}$ becomes less than 0.8.

Meanwhile, to detect stably the departure of the lane, the departure ratio of the lane may be calculated by applying weight factors for multiple numbers of contiguous frames. One example of the weight is the Gaussian distribution and the weight factors in accordance with a Gaussian distribution are shown in Table 1 for departures ratio of five frames according to equation 4.

TABLE 1

| i | 0 | 1 | 2 | 3 | 4 |
|---|---|---|---|---|---|
| w(i) | 0.2075 | 0.2062 | 0.2024 | 0.1962 | 0.1878 |

$$l_o^{filt}(k) = \sum_{i=0}^{4} w(i) l_o(k-i) \quad \text{Equation 4}$$

The technical features described above can be implemented in the form of program instructions that may be performed using various computer means and may be recorded in a computer-readable medium. Such a computer-readable medium may include program instructions, data files, data structures, etc., alone or in combination. The program instructions recorded on the medium may be designed and configured specifically for the present disclosure or may be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above may be made to operate as one or more software modules that perform the actions of the embodiments of the disclosure, and vice versa.

Components in the exemplary embodiments described above may be easily understood from the perspective of processes. That is, each component may also be understood as an individual process. Likewise, processes in the exemplary embodiments described above may be easily understood from the perspective of components. The exemplary embodiments of the disclosure described above are disclosed only for illustrative purposes. A person having ordinary skill in the art would be able to make various modifications, alterations, and additions without departing from the spirit and scope of the disclosure, but it is to be appreciated that such modifications, alterations, and additions are encompassed by the scope of claims set forth below.

What is claimed is:

1. A device for detecting a lane of a vehicle, comprising:
a first Region Of Interest (ROI) setting unit configured to determine a rectangular ROI from an input image which is a road image;
a second ROI setting unit configured to determine a Λ-ROI having distorted trapezoidal shape from the rectangular ROI; and
a lane detection unit configured to detect the lane including a left lane marking and a right lane marking in the Λ-ROI,
wherein, the second ROI setting unit is configured to calculate a merged first line segment through merging process of first line segments extracted from the rectangular ROI, configured to obtain a left second line segment and a right second line segment based on scanning brightness, configured to determine the left second line segment and the right second line segment as a temporary left lane marking and a temporary right lane marking when a preset first condition is satisfied, and configured to determine the Λ-ROI by changing a slope of the temporary left lane marking and a slope of the temporary right lane marking in a predetermined range.

2. The device of claim 1, wherein the rectangular ROI is a color image, and
wherein the second ROI setting unit is configured to convert the color image of rectangular ROI into a gray scale image of rectangular ROI, configured to extract the first line segments from the gray scale image of rectangular ROI, or configured to add color difference information of the color image of rectangular ROI to the gray scale image of rectangular ROI and is configured to extract the first line segments from the gray scale image of rectangular ROI to which the color difference information is added.

3. The device of claim 2, wherein the color difference information includes U-V information or V-U information,
wherein the second ROI setting unit is configured to extract the first line segments from the gray scale image of rectangular ROI to which the color difference information is added when a standard deviation of the color difference information is greater than a preset threshold value, and
wherein the second ROI setting unit is configured to extract the first line segments by using the gray scale image of rectangular ROI when the standard deviation of the color difference information is less than the preset threshold value.

4. The device of claim 1, wherein the merging process is performed at least once while at least two first line segments exist, and in each merging process, the second ROI setting unit merges two extracted or previously merged first line segments, and
wherein the second ROI setting unit is configured to determine an upper horizontal line and a lower horizontal line for the merging, extends one or two extracted or previously merged first line segments to enable the extended extracted or previously merged first line segments to abut the upper horizontal line and the lower horizontal line, merges extended or unexpanded two extracted or previously merged first line segments when a distance between two intersection points of the upper or lower horizontal line and the extended or unexpanded two extracted or previously merged first line segments is less than a preset threshold distance, and difference of slopes of the two first line segments is less than a preset threshold slope.

5. The device of claim 4, wherein the merging process is performed hierarchically in the order of vertical merging process and then horizontal merging process, and the vertical merging process and the horizontal merging process have different preset threshold distance and preset threshold slope, and
wherein the vertical merging process is configured to merge first line segments extracted from the same side of a lane marking, and the horizontal merging process is configured to merge the extracted or previously merged first line segments originated from the opposite side of a lane marking.

6. The device of claim 1, wherein the second ROI setting unit is configured to calculate the left second line segment and the right second line segment by comparing the scanned brightness and derivative of the brightness along plurality of imaginary horizontal lines that cross the merged first line segment with a predetermined brightness.

7. The device of claim 1, wherein the preset first condition includes at least one selected from a group consisting of preset slope, predetermined width of the lane and preset location of a vanishing point.

8. The device of claim 1, wherein the second ROI setting unit is configured to determine the left lane marking and the right lane marking by merging temporary lane markings in specific number of contiguous frames included in the input image.

9. The device of claim 1, wherein the lane detection unit is configured to calculate a merged third line segment through merging process of third line segments extracted in the Λ-ROI, is configured to obtain a left fourth line segment and a right fourth line segment by scanning brightness, is configured to determine the left fourth line segment and the right fourth line segment as the left lane marking and the right lane marking when a preset second condition is satisfied, and wherein the preset second condition includes at least one selected from a group consisting of a preset slope, a predetermined width of the lane, a preset location of a vanishing point and symmetry of lane marking accumulated at previous frames.

10. The device of claim 9, wherein the Λ-ROI is a color image, and wherein the lane detection unit is configured to convert the color image of Λ-ROI into a gray scale image of Λ-ROI, is configured to extract the third line segments from the gray scale image of Λ-ROI, or is configured to add color difference information of the color image of Λ-ROI to the gray scale image of Λ-ROI and extracts the third line segments from the gray scale image of Λ-ROI to which the color difference information is added.

11. A device for detecting lane departure of a vehicle, comprising:

a first Region Of Interest (ROI) setting unit configured to determine a rectangular ROI from an input image which is a road image;

a second ROI setting unit configured to determine a Λ-ROI having a distorted trapezoidal shape from the rectangular ROI;

a lane detection unit configured to detect a lane including a left lane marking and a right lane marking in the Λ-ROI; and a lane departure determining unit configured to calculate a departure ratio of the lane from the detected lane, and determines when the vehicle departs the lane based on the calculated departure ratio, wherein the lane departure determining unit is configured to determine a width of the lane in the input image based on the left lane marking and the right lane marking, and configured to calculate the departure ratio of the lane based on the obtained width of the lane and a width of the vehicle in the input image.

12. The device of claim 11, wherein the obtained width of the lane corresponds to a distance between a first intersection point of a base line of the rectangular ROI and the left lane marking and a second intersection point of the base line of the rectangular ROI and the right lane marking.

13. The device of claim 12, wherein the lane departure determining unit is configured to calculate the departure ratio of the lane using a midpoint between the first intersection point and the second intersection point, a third intersection point of a perpendicular bisector of the base line of the rectangular ROI passing a vanishing point disposed on a topside of the rectangular ROI and the base line of the rectangular ROI, the obtained width of the lane and the width of the vehicle.

14. The device of claim 13, wherein the lane departure determining unit is configured to calculate respectively, a departure ratio in the left and right direction using the midpoint, the third intersection point, the obtained width of the lane and the obtained width of the vehicle, and determines that the vehicle departs the lane when a higher departure ratio of the departure ratios is greater than a preset threshold value.

15. The device of claim 13, wherein the lane departure determination unit is configured to determine that the vehicle changes lanes when the departure ratio is in the pre-determined range and a turn light is on, and wherein the lane departure determination unit is configured to determine that the vehicle departs the lane when the departure ratio is in the pre-determined range and the turn light is off.

16. A method of detecting a lane of a vehicle performed in a device including a processor, comprising:

setting, by the processor, a rectangular Region Of Interest (ROI) from an input image which is a road image;

setting, by the processor, a Λ-ROI having distorted trapezoidal shape from the rectangular ROI; and detecting, by the processor, the lane including a left lane marking and a right lane marking in the Λ-ROI, wherein the setting the Λ-ROI includes calculating, by the processor, a merged first line segment through merging process of first line segments extracted from the rectangular ROI, obtaining, by the processor, a left second line segment and a right second line segment by scanning brightness, determining, by the processor, the left second line segment and the right second line segment as a temporary left lane marking and a temporary right lane marking when a preset first condition is satisfied, and setting, by the processor, the Λ-ROI by changing a slope of the temporary left lane marking and a slope of the temporary right lane marking in a predetermined range.

17. A method of determining lane departure of a vehicle performed in a device including a processor, comprising:

setting, by the processor, a rectangular Region Of Interest (ROI) from an input image which is a road image;

setting, by the processor, a Λ-ROI having a distorted trapezoidal shape from the rectangular ROI;

detecting, by the processor, the lane including a left lane marking and a right lane marking in the Λ-ROI, and obtaining, by the processor, a departure ratio of the lane from the detected lane, and determining when the vehicle departs the lane by using the obtained departure ratio, wherein the lane departure determining unit is configured to determine a width of the lane in the input image using the left lane marking and the right lane marking, and is configured to determine the departure ratio of the lane using the width of the lane and a width of the vehicle in the input image.

* * * * *